March 27, 1945.  E. E. HANS  2,372,377
RAIN SEPARATOR FOR AUTOMOBILE VENTILATING DEVICES
Original Filed March 12, 1940  4 Sheets-Sheet 1

INVENTOR
Edmund E. Hans
BY
*Bernard F Baldwin*
ATTORNEY

March 27, 1945.  E. E. HANS  2,372,377
RAIN SEPARATOR FOR AUTOMOBILE VENTILATING DEVICES
Original Filed March 12, 1940  4 Sheets-Sheet 2

INVENTOR
Edmund E. Hans
BY
ATTORNEY

Patented Mar. 27, 1945

2,372,377

UNITED STATES PATENT OFFICE 2,372,377

RAIN SEPARATOR FOR AUTOMOBILE VENTILATING DEVICES

Edmund E. Hans, Detroit, Mich.

Original application March 12, 1940, Serial No. 323,589, now Patent No. 2,304,643, dated December 8, 1942. Divided and this application May 16, 1942, Serial No. 443,221

7 Claims. (Cl. 98—2)

This invention relates to rain separators for automobile ventilating devices, and is a division of application Serial No. 323,589, which became Patent No. 2,304,643 and was issued on December 8, 1942. It is an object of the invention to provide a rain separator for use between a fresh air inlet and a ventilating means through which air is discharged into a vehicle either at outside temperature or after being heated in the device, so that the water is extracted by the separator and is not discharged into the vehicle with the air. Thus I aim to provide means for permitting full use of the ventilating device during wet weather.

Another object of the invention is to provide such a rain separator which offers very little resistance to the flow of air passing therethrough, so that the separator may be employed in summer when the fan mechanism in the ventilating device is not in use as well as in winter when the ventilating device is in full operation.

An embodiment of the invention is hereinafter more fully described in its association with one type of ventilating device in which it is utilized.

Figures 1, 5:
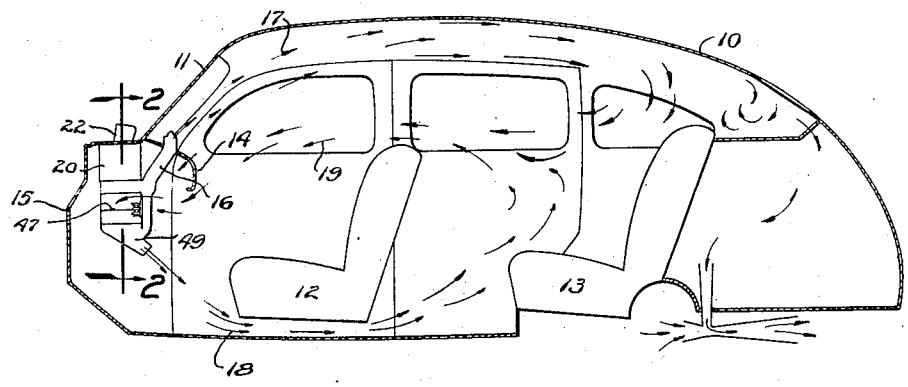
Figure 1 is a diagrammatic vertical section through a closed automobile body wherein the rain separator is employed in a ventilating device.
Figure 2:
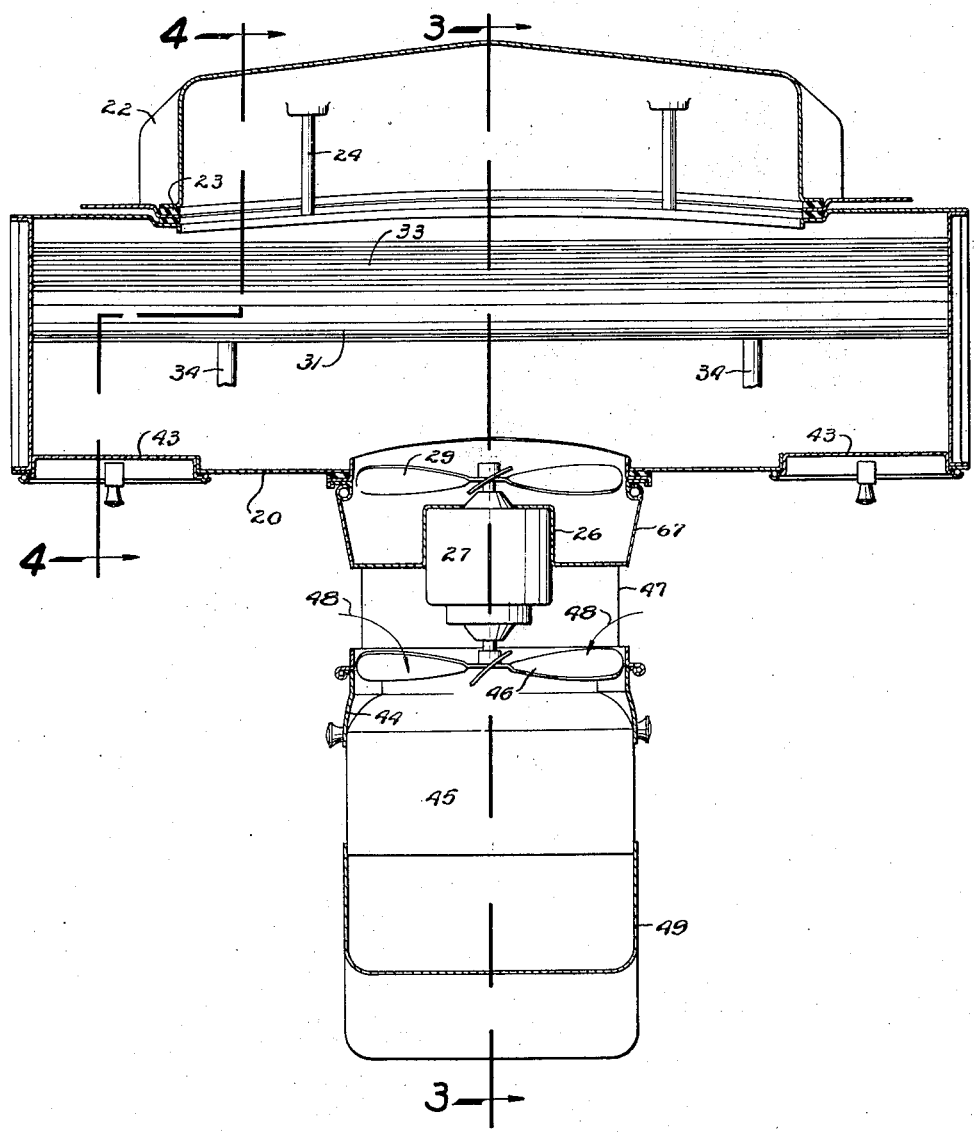
Figure 2 is an enlarged section on the line 2—2 of Figure 1.
Figure 3:
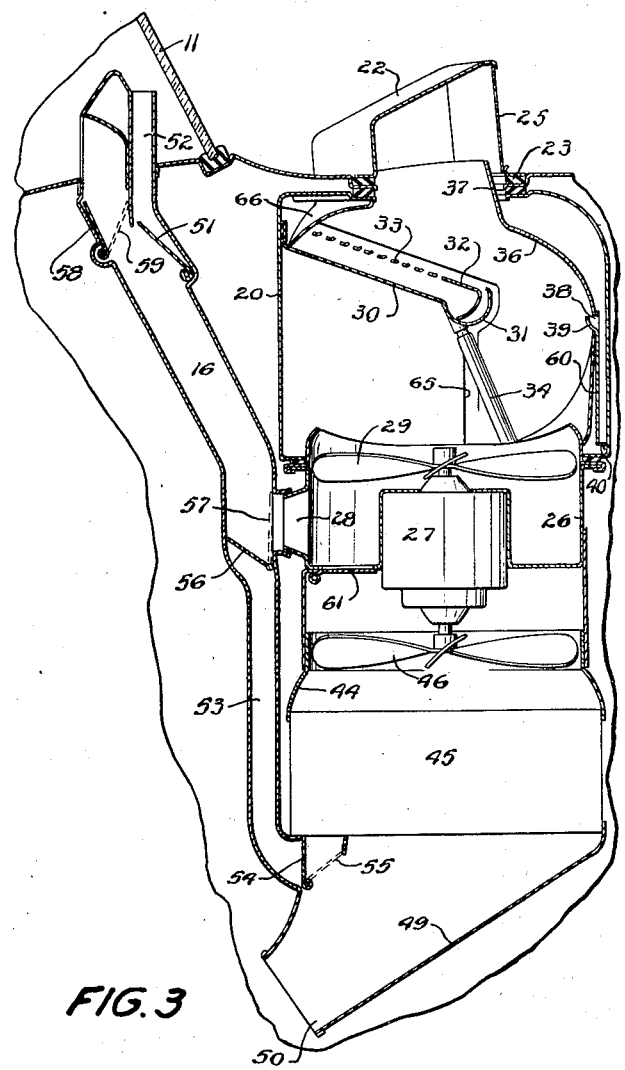
Figure 4:
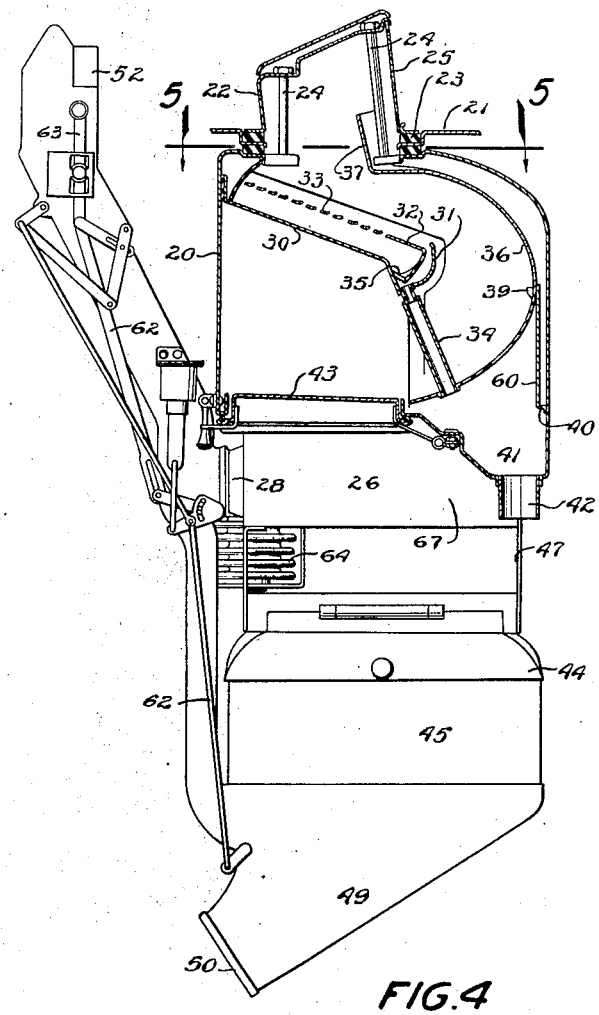

Figures 3 and 4 are sections on the lines 3—3 and 4—4 respectively of Figure 2, and Figure 5 is a section on the line 5—5 of Figure 4.

In order that the ventilating device and its association with the rain separator may be more readily understood I will first briefly describe the former wherein the latter is, in the present instance, employed.

In the drawings, 10 designates a closed type vehicle body having seats 12 and 13 therein, a windshield 11, instrument board 14, a dash 15, and an apertured cowl 21. Between the instrument board 14 and the dash 15 a sheet metal chamber 20 is provided which is apertured at the top to register with the aperture in the cowl 21. Upon the latter and around the opening a scoop 22 is mounted on a gasket 23 and is held in place by bolts 24 which also extend through the top of the chamber 20 to hold the latter in position. 25 is a screen mounted in the scoop 22. The bottom of the chamber 20 is centrally apertured and opens into an upper fan housing 26 having a rearwardly disposed lateral outlet 28. The housing 26 at the bottom is provided with a hinged door 61 which may be opened to permit passage of air into a bottom fan housing 44, and this housing 26 also has side doors 67 which may be opened to admit air from within the vehicle body 10 and permit its passage into the housing 26. Mounted partly in the upper and partly in the lower fan housing, 26 and 44 respectively, is a vertical motor 27 the shaft of which extends both into the upper housing 26 wherein an upper fan 29 is mounted thereon, and also into the lower housing 44 wherein a lower fan 46 is mounted thereon. The lower housing 44, which is provided with openings 47 at its sides, has a heater core 45 therein a flow of water into which may be controlled by a thermostat 64. The heater core 45 in turn opens into a collector 49 which is provided with a downwardly and rearwardly disposed outlet 50.

The outlet 28 opens into a duct 16 which is upwardly directed and adjacent its open upper end a defroster nozzle 52 extends therefrom. Projecting downward from the bottom of the duct 16 is an extension 53 which opens into the collector 49. A pivoted valve 54, adapted to assume an open position 55, controls the opening of the extension 53 into the collector 49; a pivoted valve 56 in the bottom of the duct 16 normally closes the extension 53, or may be moved to its position indicated at 57 to close the outlet 28 and permit an air flow from the extension into the duct 16; a pivot valve 51 is provided in the duct 16 to control the passage of air therefrom into the defroster nozzle 52; and a pivot valve 58, also in the duct 16, may be moved to its position indicated at 59 to prevent the passage of air upwardly through the open top of the said duct. A system of levers 62, which may be operated through a suitable control 63, regulates the positions of the valves 54, 56, 58 and 51.

The passage of air through the device is as follows: Air from outside enters through the opening in the cowl 21 and passes into the chamber 20 and top housing 26 whence it is usually discharged by the top fan 29 through the outlet 28 and the duct 16 and flows upwardly and rearwardly in the vehicle body 10 as indicated by the arrows 17. Meanwhile air for recirculation enters the lower housing 44 through the end openings 47 as indicated by the arrows 48 whence it is discharged by the lower fan 46 through the outlet 50 after passage through the heater core 45, and follows a lower path indicated by the arrows 18 in the vehicle body. Both the upper and lower streams of air 17 and 18 reach an intermediate level toward the rear of the body 10 and return forwardly as indicated by the arrows 19 to the openings 47 for recirculation. Meanwhile some air constantly escapes around windows and doors and this loss is compensated for by fresh air admitted through the opening in the cowl 21.

Obviously by opening the door 61 at least some of the outside air may be admitted into the bottom fan housing 46 for circulation through the heater core 45 and either for circulation as indicated by the arrows 18 and 19 or some of this after, air passing through the heater core 45 may be allowed to flow up the extension 53 and the duct 16 by moving the valves 54 and 56 to their positions indicated at 55 and 57. Laterally disposed doors 43 are also provided in the bottom of the chamber 20 which, when open, permit passage of outside air directly downward into the body of the vehicle.

From the foregoing it will be readily seen that should rain enter the chamber 20 with the air and not be removed therefrom this rain would be discharged with air passing out of the duct 16, or through the doors 43 if open, to the annoyance of occupants of the vehicle.

My rain extractor in its preferred form consists of the following arrangement: Formed within the chamber 20 and extending across its entire width from the bottom of the front wall thereof is a downwardly projecting sump 41, through the bottom of which suitable drain outlets 42 are provided. A baffle plate 30 extending across the entire chamber 20 projects forwardly and downwardly from the rear wall of the latter and terminates at its lower extremity in a transverse trough 31 which is positioned forwardly of the center of the chamber and intermediately of the height of the latter. Mounted above the plate 30 and parallel therewith is a louvered plate 32 having louvers 33 therein which extend the full width of the chamber. The lower, forward extremity of the louvered plate 32 is downwardly and rearwardly turned and rests upon the bottom of the trough 31, and, as shown in Figure 4, openings 35 are formed through the downturned edge of the plate 32 to permit water to flow from the plate 32 into the trough 31 and into conduits 34 extending through the bottom of the latter forwardly and downwardly toward the sump 41.

As will be seen in Figure 4, a smooth forwardly and downwardly curved deflecting plate 36 extends from its upwardly turned margin 37 which projects through the opening in the cowl 21 above which the scoop 22 is provided. This deflecting plate which is substantially semi-circular in section is downwardly and rearwardly curved toward its lower extremity and through this lower portion the conduits 34 extend. Obviously air entering the scoop 22 which passes over the flexed margin 37 of the deflecting plate 36 is forwardly and downwardly directed by the latter and passes in front of the trough 31. The point of greatest restriction is between the bottom of the plate 32 and the plate 36 so that there the throat of a venturi is formed through which the air flows. Tests have shown that more air passes through the separator if this throat is relatively narrow than if it is widened. This feature is of importance because when the throat is thus properly proportioned it insures an adequate air flow therethrough at all times. A curved shield 66 extends from the bottom rear edge of the scoop 22 rearwardly and downwardly to the pan or baffle plate 30 to catch and deflect water entering through the scoop 22 onto the said plate 30, whence it runs down to the trough 31 and through the conduits 34 to drop into the sump 41. 65 denotes vertical grooves formed in opposite sides of the chamber 20 to direct water collected on the chamber sides into the sump 41.

The lower extremity of a plate 60 is secured to the front wall of the chamber 20 within the latter and intermediately of the height of the chamber. This plate 60 is turned so that it extends upwardly parallel with and spaced from the said front chamber wall to form a vertical passage between them. A transverse slot 38 is formed in the curved wall 36 substantially in horizontal alignment with the trough 31 and through this slot a lip 39 formed upon the upper margin of the plate 60 extends. The lower extremity of the plate 60 adjacent its junction with the front chamber wall has apertures 40 formed therethrough to permit water passing down between the plate 60 and the front wall of the chamber 20 to drop into the sump 41.

From the foregoing it will be seen that some rain strikes the front of the upwardly turned margin 37 of the deflector plate 36 and runs down between the plate 60 and the front of the chamber 20 to the openings 40 and drops through the latter into the sump 41. The rest of the rain passes above the upwardly turned margin 37 and much of it comes into contact with the shield 66 and flows downwardly and rearwardly thereon to the baffle plate 30 and thus to the trough 31 and down the conduits 34 to the sump. The purpose of the louvered plate 32 is two fold. Firstly it prevents the air which is travelling at high velocity blowing water off the baffle plate 30 and out of the trough 31 back into the air stream; and it also catches some rain. This rain either passes through the louvers 33 into the trough 31 or else flows over the plate 32 to the apertures 35 and thus to the conduits 34. Rain which is still in the air stream is brought into contact with the downwardly and forwardly curved portion of the deflector plate 36 and flows down the latter to the lip 39 whence it passes down the front of the wall 60 and through the openings 40 into the sump 41. Meanwhile some water also is received in and flows down the vertical grooves 65.

While in the foregoing the preferred embodiment of the invention has been described and shown, it is understood that alterations and modifications may be made thereto provided the said alterations and modifications fall within the scope of the appended claims:

What I claim is:

1. In a rain separator for automobile ventilating devices, a casing having a chamber therein adapted to be mounted in an automobile body beneath an apertured cowl, said casing having an inlet opening into said chamber registering with the cowl aperture for the admission of fresh air and an outlet from said chamber opening into said automobile body for discharge of the air, into the latter, an imperforate baffle plate in said chamber extending forwardly and downwardly from the rear wall of the casing and terminating in spaced relation to the front wall thereof, said baffle plate being interposed between said inlet and outlet, a louvered plate parallel with and over said baffle plate through which water from the air flowing through said chamber drops onto said baffle plate, and outlet means through which the water from the baffle plate flows.

2. In a rain separator for automobile ventilating devices, a casing having a chamber therein adapted to be mounted in an automobile body beneath an apertured cowl, said casing having an inlet opening into said chamber registering with the cowl aperture for the admission of fresh air thereinto, and an outlet from said chamber opening into the automobile body for the discharge of the air into said body, an imperforate baffle plate interposed between the inlet and the outlet extending forwardly and downwardly in the chamber from the rear wall of the casing and terminating forwardly of the center of the chamber, a trough extending across the forward margin of the baffle plate, a transversely louvered plate over the baffle plate and trough through which water from the air drops, and outlet means for the water from the trough.

3. A rain separator for automobile ventilating devices including a hollow casing adapted to be mounted in an automobile body beneath an apertured cowl, said casing having an inlet therein registering with the cowl aperture for admission of fresh air thereinto and an outlet for the discharge of the air into the automobile body, an imperforate baffle plate interposed between the inlet and the outlet extending forwardly and downwardly within the casing from its rear wall, a trough extending across the front margin of the baffle plate to receive water therefrom, said trough being rearwardly spaced from the front wall of the casing, a louvered plate over the baffle plate through which water from the air drops onto the baffle plate, and outlet means extending from the trough through which the water flows.

4. In a rain separator for automobile ventilating devices, a casing having a chamber therein adapted to be mounted in an automobile body beneath an apertured cowl, said casing having an inlet opening into the top of the chamber registering with the cowl aperture for admission of fresh air into said chamber and an outlet from the bottom of said chamber opening into the automobile body for the discharge of said air, a baffle plate in said chamber extending between the inlet and the outlet projecting forwardly and downwardly from the rear wall of the casing and spaced from the front wall of the latter across its front extremity, a shield projecting downwardly and rearwardly from the back of the inlet to the back of the baffle plate down which water from the air flows, a louvered plate extending over the baffle plate through which water from the air drops onto the latter, and outlet means through which water from the baffle plate flows.

5. In a rain separator for automobile ventilating devices, a casing having a chamber therein adapted to be mounted in an automobile body beneath an apertured cowl, said casing having an inlet opening into said chamber registering with the cowl aperture and an outlet from said chamber opening into said body, a curved deflector plate within the chamber, an impervious baffle plate in said chamber interposed between the inlet and the outlet, said baffle plate projecting forwardly and downwardly from the rear wall of the casing and having its front margin spaced from the deflector plate whereby a throat of decreased width is formed between them, a louvered plate extending over the baffle plate through which water passes which is extracted from air flowing between the inlet and the outlet onto said baffle plate, and downwardly disposed conduits through which water from the baffle plate passes.

6. In a rain separator for automobile ventilating devices, a casing having a chamber therein adapted to be mounted in an automobile body beneath an apertured cowl, an inlet in the top of the casing adapted to register with the cowl aperture for the admission of fresh air into said chamber and an outlet in the bottom of said casing through which the air passes from the chamber into the automobile body, a substantially semi-circular deflector plate in said casing having its portion substantially centrally of its height forwardly bowed toward the front wall of the casing, an impervious baffle plate in said casing projecting forwardly and downwardly from the rear wall thereof and having its front margin spaced from the deflector plate intermediately of the height of the latter whereby said baffle plate is interposed between said inlet and outlet, a louvered plate extending over the baffle plate, a sump beneath the bottom of the curved deflector plate, and conduits through which water from the baffle plate flows to the sump.

7. In a rain separator for automobile ventilating devices, a casing having a chamber therein adapted to be mounted in an automobile body beneath an apertured cowl, an inlet in the top of the casing adapted to register with the cowl aperture for admission of fresh air into said chamber and an outlet in the bottom of the casing for discharge of the air into the automobile body, a substantially semi-circular deflector plate in the casing having its portion substantially centrally of its height forwardly bowed toward the front wall of the casing and adjacent thereto, an impervious baffle plate in the chamber interposed between the inlet and the outlet and extending forwardly and downwardly from the rear wall of the casing and having its front margin spaced from the rear of the deflector plate intermediately of the height of the latter whereby a throat is formed between them through which air flowing from the inlet to the outlet passes and water extracted from the air strikes the rear face of the deflector plate, the latter being apertured intermediately of its height, rearward projecting lips formed on the undersides of said apertures to receive water flowing down the plate and divert it through said apertures onto the front of the plate, and a sump beneath the front of the deflector plate into which said water passes.

EDMUND E. HANS.